Jan. 21, 1941.　　　R. W. SIMON ET AL　　　2,229,227
DIRECT CURRENT CARBON ARC SYSTEM
Filed Jan. 25, 1939
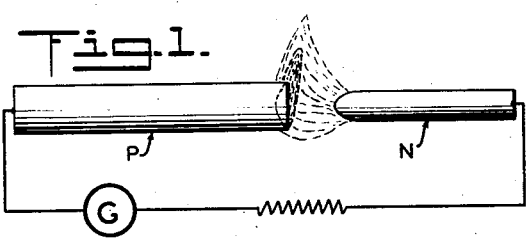
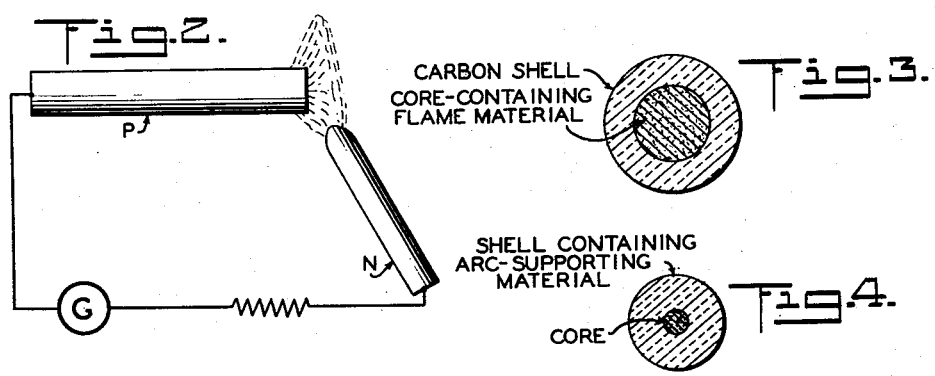
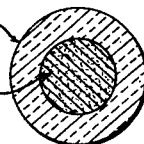
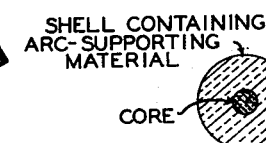
INVENTORS
RUSSELL W. SIMON
WILLIAM W. LOZIER
BY
ATTORNEY Patented Jan. 21, 1941

2,229,227

UNITED STATES PATENT OFFICE 2,229,227

DIRECT CURRENT CARBON ARC SYSTEM

Russell W. Simon and William W. Lozier, Fostoria, Ohio, assignors to National Carbon Company, Inc., a corporation of New York Application January 25, 1939, Serial No. 252,718

8 Claims. (Cl. 176—134)

The invention relates to a direct-current carbon arc system of the type useful in providing a light source for motion picture projection, or for other purposes where light energy of high intrinsic brilliancy is desired, and is particularly concerned with an improved negative electrode for use in such system.

The conventional direct current arc system comprises a positive and negative carbon electrode arranged at an angle to each other, or coaxially, in arc relationship, and burning under conditions which provide a current density in the positive electrode sufficient to establish thereon a brilliant light source. The positive electrode usually has a relatively large core containing substantial amounts of rare earth metal compounds or other flame producing material for increasing the brilliancy of the luminous gases in a high intensity arc, or for otherwise modifying the arc characteristics. A core of relatively small diameter is also commonly employed in the negative electrode, in which there is usually incorporated an arc supporting material for the purpose of steadying the arc and centering its contact with this electrode. This core may also contain flame materials, if desired. The shell of both electrodes consists normally of a baked composition of substantially pure carbon containing no additive materials.

To produce a satisfactory and reliable light source, arc stability and steadiness are of essential importance. Incorporating arc supporting material in the core of the negative electrode will contribute a steadying effect, and has heretofore been quite universally adopted as a suitable manner of promoting arc stability. While this is effective under ideal burning conditions, it does not entirely avoid arc unsteadiness where it may be difficult, as is often the case, to control accurately all factors influencing proper arc operation. There is a tendency, for example, under certain burning conditions, to form on the tip of the negative electrode a coating or layer of carbide derived from the flame material in the core of the positive electrode. This carbide deposit is definitely undesirable, and because of its highly insulating qualities, it causes the arc flame to wander erratically over the end of the negative electrode, producing a very unsteady light radiation. A heavy carbide layer may even prevent restriking of the arc when it is once interrupted. This phenomenon is especially prevalent in direct current arc systems employing a stationary positive electrode in a horizontal trim, and burning under comparatively low amperage and a short arc.

It is an object of this invention to provide a direct current carbon arc system capable of producing a more uniform and stable source of light radiation over a wider and more variable range of burning conditions. A further object is to provide an improved negative electrode for use in such system which is resistant to the formation of carbide on the tip while burning in the arc.

We have found that arc steadiness may be substantially improved by modifying the shell composition of the negative electrode, and incorporating therein suitable quantities of an arc supporting material. A carbon electrode of this type will burn as a negative in arc relationship with a conventional positive electrode, without any substantial formation of carbide on the tip, and the arc contact to the negative remains more constant under all burning conditions. It appears that the presence of arc supporting material in the shell of the negative carbon electrode produces results in eliminating carbide formation which cannot be accomplished with the same material solely in the core composition, and while a theory explaining such phenomenon is not immediately apparent, definite evidence of improved burning characteristics in a carbon trim of this nature has been established.

Materials heretofore known and used in an arc supporting capacity are quite suitable for the purpose of this invention, among which are the alkali metal compounds, in particular potassium salts. Potassium sulfate and potassium silicate have been found very effective when incorporated into the negative electrode shell in quantities of about 3% to 5% by weight of the finished shell composition. The manner of introducing the arc supporting material into the shell bears no particular significance to the results obtained. This can be accomplished, for example, by impregnation of the baked shell in a saturated salt solution under pressure, with subsequent drying, or by directly blending the potassium salt into the shell mix composition prior to extrusion or forming of the carbon.

As previously indicated, the most common negative electrode for use in a direct current arc contains a central core of arc supporting characteristics, which core is usually introduced by extrusion into the formed and baked hollow shell. A similar core may be used in accordance with this invention, provided that the requisite amount of arc supporting material, over and above that used in the core, is intimately distributed throughout the baked carbon shell. Both with and without a central core the presence of arc supporting material in the carbon shell has proven of distinct advantage, and will retard or entirely prevent carbide formation on the negative electrode tip in any known type of direct current carbon arc system.

The accompanying drawing is further illustrative of the invention and is largely self-descriptive from the legends thereon. Figures 1 and 2 represent diagrammatically two embodiments of a direct current carbon arc trim arrangement in which the new negative electrode is well adapted for use. In Figure 1 the trim is in horizontal coaxial position, burning under high intensity conditions, with the positive usually stationary or non-rotating; representing an arc in which the advantages afforded by this invention are of particular value. Figure 2 represents an angular trim arc of the low intensity type, which is commonly referred to as a flame arc. Figure 3 is a cross section of a conventional direct current positive carbon showing the comparatively large core containing flame material, and which constitutes the positive electrode in an arc system with which the disclosed negative electrode finds particular use. The new negative electrode of the invention is represented in cross section by Figure 4, and as indicated, contains arc-supporting material in intimate mixture with the carbon shell. The small central core of Figure 4 may be of similar composition to core mixes heretofore used, and the shell of either the positive or negative carbon may be coated with copper or other metal to increase the current carrying capacity of specific sized carbons.

It will be understood that considerable modification is possible within the broader scope of the invention, particularly with respect to the type of arc system with which the proposed negative is adapted for valuable use, including any conventional trim position or operation where formation of carbide tip on the negative has heretofore been troublesome. Advantages are afforded in practically any type of direct current arc, either of high intensity, where the current density on the positive carbon is in the neighborhood of 500 amperes or higher per square inch cross section, or in the flame type arc which may burn at a current density of as low as 150 amperes per square inch. The invention should not be limited other than as defined in the appended claims.

We claim:

1. An "anti-carbide tip" negative electrode for a direct current carbon arc, comprising a shell enclosing a core, said shell predominantly consisting of carbon with an arc-supporting material intimately and uniformly dispersed therein, said arc-supporting material constituting an amount not substantially greater than about 5% by weight of the total shell composition.

2. An "anti-carbide tip" negative electrode for a high intensity direct current carbon arc, comprising a shell enclosing a core containing arc-supporting material, said shell predominantly consisting of carbon with an arc-supporting material intimately and uniformly dispersed therein, said arc-supporting material constituting an amount not substantially greater than about 5% by weight of the total shell composition.

3. An "anti-carbide tip" negative electrode for a high intensity direct current carbon arc, comprising a shell enclosing a core containing arc-supporting material, said shell predominantly consisting of carbon with an arc-supporting material of an alkali metal salt intimately and uniformly dispersed therein, the amount of said arc-supporting material being not substantially greater than about 5% by weight of the total shell composition.

4. An "anti-carbide tip" negative electrode for a high intensity direct current carbon arc, comprising a shell enclosing a core containing arc-supporting material, said shell predominantly consisting of carbon with an arc-supporting material intimately and uniformly dispersed therein, said arc-supporting material being composed of a compound of the group consisting of potassium sulfate and potassium silicate in an amount not substantially greater than about 5% by weight of the total shell composition.

5. An "anti-carbide tip" negative electrode for a high intensity direct current carbon arc, comprising a shell enclosing a core containing arc-supporting material, said shell predominantly consisting of carbon with an arc-supporting material intimately and uniformly dispersed therein, said arc-supporting material being composed of a compound of the group consisting of potassium sulfate and potassium silicate in an amount of about 3% to 5% by weight of the total shell composition.

6. An "anti-carbide tip" negative electrode for a high intensity direct current carbon arc, comprising a metal coated shell enclosing a core containing arc-supporting material, said shell predominantly consisting of carbon with an arc-supporting material intimately and uniformly dispersed therein, said arc-supporting material being composed of a compound of the group consisting of potassium sulfate and potassium silicate in an amount of about 3% to 5% by weight of the total shell composition.

7. A negative electrode for a direct current carbon arc, characterized by a resistance to formation of carbide on the tip when burned in such arc with a positive carbon having a core containing flame material, said negative electrode comprising a shell enclosing a core, said shell predominantly consisting of carbon with an arc-supporting material intimately and uniformly dispersed therein, said arc-supporting material constituting an amount not substantially greater than about 5% by weight of the total shell composition.

8. A negative electrode for a high intensity direct current carbon arc, characterized by a resistance to formation of carbide on the tip when burned in such arc in coaxial short arc relationship with a positive carbon having a core containing flame material, said negative electrode comprising a shell enclosing a core containing arc-supporting material, said shell predominantly consisting of carbon with an arc-supporting material intimately and uniformly dispersed therein, said arc-supporting material being composed of a compound of the group consisting of potassium sulfate and potassium silicate in an amount of about 3% to 5% by weight of the total shell composition.

RUSSELL W. SIMON.
WILLIAM W. LOZIER.